(12) United States Patent
Li et al.

(10) Patent No.: US 11,054,678 B2
(45) Date of Patent: Jul. 6, 2021

(54) DISPLAY DEVICE AND DISPLAY METHOD

(71) Applicant: BOE TECHNOLOGY GROUP CO., LTD., Beijing (CN)

(72) Inventors: Zhongxiao Li, Beijing (CN); Xue Dong, Beijing (CN); Xiaochuan Chen, Beijing (CN); Wenqing Zhao, Beijing (CN); Chenyu Chen, Beijing (CN); Ming Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 448 days.

(21) Appl. No.: 15/777,233

(22) PCT Filed: Sep. 26, 2017

(86) PCT No.: PCT/CN2017/103312
§ 371 (c)(1),
(2) Date: May 18, 2018

(87) PCT Pub. No.: WO2018/129959
PCT Pub. Date: Jul. 19, 2018

(65) Prior Publication Data
US 2020/0310172 A1    Oct. 1, 2020

(30) Foreign Application Priority Data
Jan. 11, 2017 (CN) .......................... 201710020021.3

(51) Int. Cl.
*G02F 1/13* (2006.01)
*G02F 1/133* (2006.01)
(Continued)

(52) U.S. Cl.
CPC ........ *G02F 1/1323* (2013.01); *G02F 1/13306* (2013.01); *G02F 1/133606* (2013.01); *G02F 1/134363* (2013.01); *G02F 1/133607* (2021.01)

(58) Field of Classification Search
CPC ...................................................... G02F 1/1323
See application file for complete search history.

(56) References Cited

U.S. PATENT DOCUMENTS

2012/0249407 A1    10/2012  Hatkeyama
2013/0002990 A1*    1/2013  Kosuge ............. G02F 1/134363
                                                          349/72
(Continued)

FOREIGN PATENT DOCUMENTS

CN    101187749 A    5/2008
CN    105549236 A    5/2016
(Continued)

OTHER PUBLICATIONS

Search Report and Written Opinion for International Application No. PCT/CN2017/103312 dated Jan. 3, 2018.

*Primary Examiner* — Edmond C Lau
(74) *Attorney, Agent, or Firm* — Calfee, Halter & Griswold LLP

(57) ABSTRACT

A display device and a display method. The display device includes an anti-peeping backlight module, a display panel and a regulator, the display panel being arranged on a light exit surface of the anti-peeping backlight module, and the anti-peeping backlight module being configured to emit an anti-peeping backlight; the display device has an anti-peeping OFF state and an anti-peeping ON state; wherein, in the anti-peeping OFF state, the regulator is configured to increase a divergence angle of the anti-peeping backlight so as to obtain divergent light; in the anti-peeping ON state, the regulator is configured to maintain the divergence angle of the anti-peeping backlight so as to obtain anti-peeping light. The display device and display method provided in this text can enable switching between normal display mode and an anti-peeping display mode to facilitate safe display of the display device.

17 Claims, 4 Drawing Sheets

(51) Int. Cl.
*G02F 1/13357* (2006.01)
*G02F 1/1343* (2006.01)
*G02F 1/1335* (2006.01)

(56) References Cited

U.S. PATENT DOCUMENTS

| | | | |
|---|---|---|---|
| 2015/0055055 A1* | 2/2015 | Ebisui | G02F 1/133606 |
| | | | 349/61 |
| 2017/0184885 A1* | 6/2017 | Chung | G02F 1/1323 |
| 2018/0059450 A1 | 3/2018 | Li | |
| 2018/0188603 A1* | 7/2018 | Fang | G02F 1/133602 |

FOREIGN PATENT DOCUMENTS

| | | |
|---|---|---|
| CN | 105549238 A | 5/2016 |
| CN | 205263429 U | 5/2016 |
| CN | 106249492 A | 12/2016 |
| CN | 106773179 A | 5/2017 |

* cited by examiner

DISPLAY DEVICE AND DISPLAY METHOD

RELATED APPLICATION

The present disclosure is the U.S. national phase entry of PCT/CN2017/103312, with an international filing date of Sep. 26, 2017, which claims the benefit of Chinese Patent Application CN201710020021.3 filed on Jan. 11, 2017, the entire disclosures of which are incorporated herein by reference.

TECHNICAL FIELD

The present disclosure relates to the technical field of displays, in particular to a display device and a display method.

BACKGROUND

With the development of network technologies, more and more people shop or perform account transactions online. In these operations, operators usually need to enter personal information on such display devices like computers, mobile phones, ATMs and self-service ticket machines, which can easily cause disclosure of personal information, so the anti-peeping function of display devices is gaining more and more attention.

Anti-peeping display devices in the art mainly include a display device and glasses, wherein on the display device, a lower polarizer is disposed on only the side of the array substrate, and the lenses of the glasses are polarizers corresponding to the lower polarizer on the array substrate. Operators wear the glasses to perform operations, while non-operators can only see a white screen because they are not wearing the glasses, thereby achieving an anti-peeping function.

It can be seen that anti-peeping display devices in the related art only have a fixed anti-peeping mode, and the display mode of the display device cannot be switched according to the user's need.

SUMMARY

According to a first embodiment of the present disclosure, a display device is provided, which includes: an anti-peeping backlight module, a display panel and a regulator, the display panel being arranged on a light exit surface of the anti-peeping backlight module, and the anti-peeping backlight module being configured to emit an anti-peeping backlight. The display device has an anti-peeping OFF state and an anti-peeping ON state; wherein, in the anti-peeping OFF state, the regulator is configured to increase a divergence angle of the anti-peeping backlight so as to obtain divergent light. In the anti-peeping ON state, the regulator is configured to maintain the divergence angle of the anti-peeping backlight so as to obtain an anti-peeping light.

According to a second embodiment of the present disclosure, a display method for a display device is provided that can be applied to the above-described display device. The display method includes: determining a state of the display device; if the display device is in an anti-peeping OFF state, emitting anti-peeping backlight by the anti-peeping backlight module, and increasing the divergence angle of the anti-peeping backlight using the regulator so as to obtain divergent light, such that the display panel displays images in a non-anti-peeping state; and if the display device is in the anti-peeping ON state, emitting anti-peeping backlight by the anti-peeping backlight module, and maintaining the divergence angle of the anti-peeping backlight using the regulator so as to obtain anti-peeping light, such that the display panel displays images in an anti-peeping state.

BRIEF DESCRIPTION OF THE DRAWINGS

The drawings are provided to facilitate further understanding of the present disclosure and form a part of the present disclosure. Exemplary embodiments and descriptions thereof provided in the present disclosure are only for explaining the present disclosure, but are not intended to limit the present disclosure. In the drawings.

DETAILED DESCRIPTION

Reference signs are listed as follows:
1—display panel; 2—regulator; 3—anti-peeping backlight module; 21—second substrate; 22—liquid crystal layer; 23—first electrode; 24—second electrode; 25—first substrate; 26—flat layer; 27—a second orientation layer; 28—a first orientation layer; 29—insulating layer; 31—backlight; 32—collimator.

In order to further clarify the disclosure, features and advantages of the present disclosure and technical solutions in embodiments of the present disclosure will be described clearly and completely below with reference to the drawings. As will be apparent to one having skill in the art, the described embodiments are merely some instead of all of the embodiments of the present disclosure.

Figure 1:
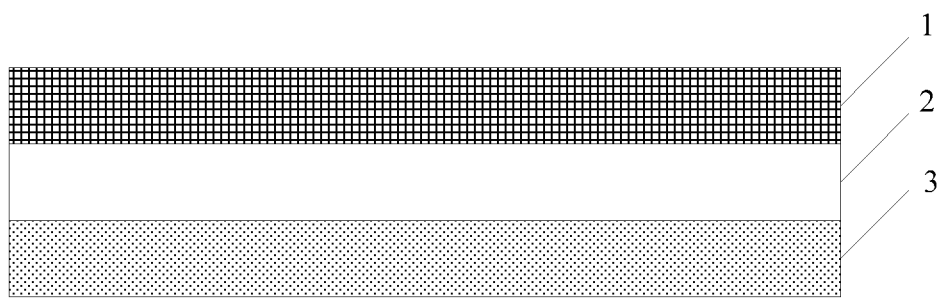
FIG. 1 is a structural diagram of a display device in an embodiment of the present disclosure.
Figure 2:
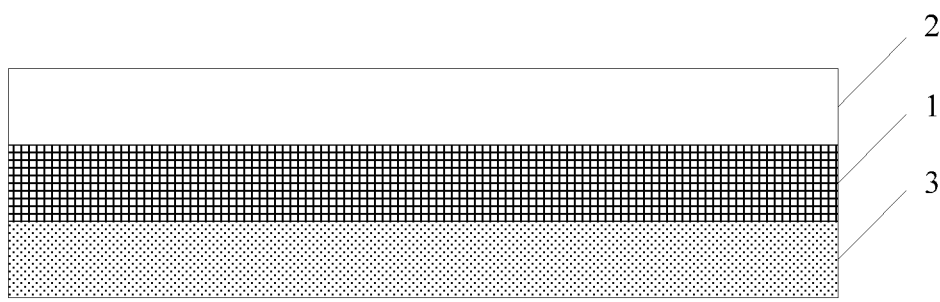
FIG. 2 is another structural diagram of the display device in an embodiment of the present disclosure.

Referring to FIGS. 1 and 2, an embodiment of the present disclosure provides a display device that comprises: a display panel 1, a regulator 2 and an anti-peeping backlight module 3. The display panel 1 is on a light exit surface of the anti-peeping backlight module 3, and the anti-peeping backlight module 3 is configured to emit an anti-peeping backlight. The display device has an anti-peeping OFF state and an anti-peeping ON state. In the anti-peeping OFF state, the regulator 2 is configured to increase a divergence angle of the anti-peeping backlight so as to obtain divergent light; and in the anti-peeping ON state, the regulator 2 is configured to maintain the divergence angle of the anti-peeping backlight so as to obtain anti-peeping light.

Specifically, the display device provided in the embodiment of the present disclosure has the following operation principle:

in the anti-peeping OFF state: the anti-peeping backlight module 3 emits anti-peeping backlight, and the regulator 2 is used for increasing the divergence angle of the anti-peeping backlight so as to obtain divergent light, such that the display panel 1 displays images in the anti-peeping OFF state;

in the anti-peeping ON state, the anti-peeping backlight module 3 emits anti-peeping backlight and the regulator 2 is used for maintaining the divergence angle of the anti-peeping backlight so as to obtain anti-peeping light, such that the display panel 1 displays images in the anti-peeping ON state.

It can be seen that the display device provided in the present disclosure comprises the anti-peeping backlight module 3 and the regulator 2, wherein the anti-peeping backlight module 3 can emit an anti-peeping backlight that has a characteristic of small divergence angle, so a good anti-peeping effect is achieved. The regulator 2 receives the anti-peeping backlight, so that the emergent angle of the anti-peeping backlight is changed after the anti-peeping backlight passes through the regulator 2. When the display device is in the anti-peeping OFF state, the regulator 2 is turned on, so that the anti-peeping backlight has an increased divergence angle after passing through the regulator 2 and divergent light is obtained, thus the display panel 1 displays images in the anti-peeping OFF state, i.e. the display device is in the normal display mode. When the display device is in the anti-peeping ON state, the regulator 2 is turned off, so that the anti-peeping backlight keeps its divergence angle unchanged after passing through the regulator 2 and anti-peeping light is obtained, thus the display panel 1 displays images in the anti-peeping ON state, i.e. the display device is in the anti-peeping display mode. It can be seen that by means of the display device provided in the present disclosure, in which the regulator 2 changes the deflection angle of the anti-peeping backlight, the display device can be enabled to switch between the normal display mode and the anti-peeping display mode.

It shall be noted that in the above embodiment, the regulator 2 can be in various positions. For example, the regulator 2 can be arranged between the light exit surface of the anti-peeping backlight module 3 and a light incident surface of the display panel 1, as shown in FIG. 1; or the regulator 2 can also be arranged on a light exit surface of the display panel 1, as shown in FIG. 2. In other embodiments, the user can freely choose the position of the regulator 2 as desired, so the position of the regulator 2 can be set flexibly.

To facilitate the operator in operating the display device, the display device can further comprise a touch screen. For example, the touch screen can be a resistive touch screen, a capacitive touch screen, an infrared touch screen, a sound wave touch screen, or a ceramic pressure controlled touch screen, etc., which is not limited in the embodiments of the present disclosure.

In order to guarantee operation effect of the touch screen, referring to FIG. 1, the regulator 2 can be arranged between the light exit surface of the anti-peeping backlight module 3 and the light incident surface of the display panel 1, and the touch screen is arranged on the light exit surface of the display panel 1. Based on such a structure, the regulator 2 first receives the anti-peeping backlight, so that the emergent angle of the anti-peeping backlight will be changed after the anti-peeping backlight passes through the regulator 2 so as to obtain the divergent light, and images are displayed when the divergent light passes through the display panel 1. At this time, the user can have good interaction experiences while operating the display device through the touch screen. If the regulator 2 is arranged on the light exit surface of the display panel 1, and the touch screen is arranged on the light exit surface of the regulator 2, since the touch screen does not directly contact the display panel 1, insensitive touch will occur while operating through the touch screen, thus the user's interaction experience while operating the display device through the touch screen would be less good.

It shall be understood that the regulator 2 in the embodiment of the present disclosure may have various structures, and two specific structures are given as examples below with reference to the drawings.

Figure 3:
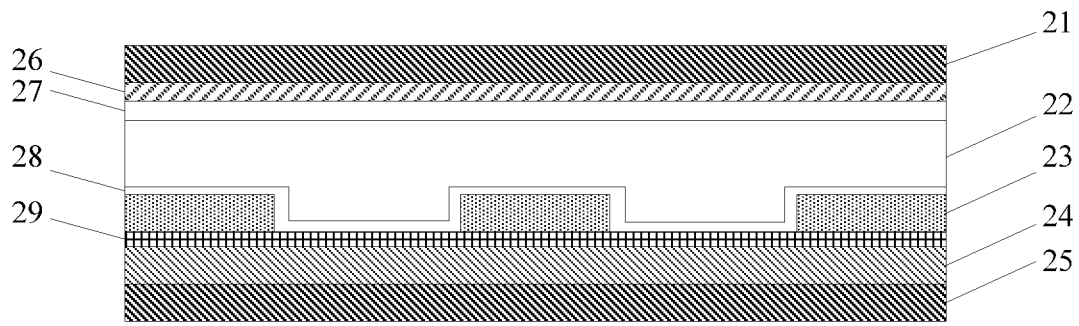
FIG. 3 is a structural diagram of a regulator of FIG. 1 or FIG. 2.

Referring to FIG. 3, the first structure of the regulator 2 may include a first substrate 25 and a second substrate 21, wherein a liquid crystal layer 22 is disposed between the first substrate 25 and the second substrate 21, a first electrode 23 is arranged between the liquid crystal layer 22 and the first substrate 25, a second electrode 24 is arranged between the first electrode 23 and the first substrate 25, and the first electrode 23 and the second electrode 24 are insulated from each other.

As an example, the regulating principle of obtaining the divergent light or anti-peeping light through the regulator 2 may be as follows:

in the anti-peeping OFF state: deflection states of liquid crystal molecules are controlled by means of the first electrode 23 and the second electrode 24, so that the liquid crystal molecules deflect to increase the divergence angle of the anti-peeping backlight, thereby obtaining the divergent light;

in the anti-peeping ON state: deflection states of the liquid crystal molecules are controlled by means of the first electrode 23 and the second electrode 24, so that the liquid crystal molecules do not deflect and the divergence angle of the anti-peeping backlight is maintained, thereby obtaining the anti-peeping light.

In the case of using such a structure, when a driving voltage is applied to the first electrode 23 and the second electrode 24, an electric field will be generated between the first electrode 23 and the second electrode 24 to drive the liquid crystal molecules in the liquid crystal layer 22 to deflect, thereby controlling the deflection states of the liquid crystal molecules. Therefore, by controlling the driving voltage applied to the first electrode 23 and the second electrode 24, the angle of deflection of the anti-peeping backlight transmitted in the liquid crystal layer 22 can be changed, thereby enabling the anti-peeping device to switch between the normal display mode and the anti-peeping display mode.

Referring to FIG. 3, the regulator 2 may further comprise an insulating layer 29, a first orientation layer 28, a second orientation layer 27 and a flat layer 26, wherein the insulating layer 29 is arranged between the first electrode 23 and the second electrode 24, the first orientation layer 28 is arranged between the first electrode 23 and the liquid crystal layer 22, the second orientation layer 27 is arranged between the liquid crystal layer 22 and the second substrate 21, and the flat layer 26 is arranged between the second orientation layer 27 and the second substrate 21.

In addition, in order to enable the regulator 2 to control the anti-peeping backlight, the regulator 2 may further comprise a first drive circuit connected to the first electrode 23 and a second drive circuit connected to the second electrode 24; wherein the first drive circuit can be a DC (Direct Current) drive circuit or a square wave drive circuit, and the second drive circuit can be a DC drive circuit. The first drive circuit provides a first drive signal to the first electrode, and the second drive circuit provides a second drive signal to the second electrode.

When the first drive circuit is a DC drive circuit, in the anti-peeping OFF state, a voltage $V_1$ provided by the first drive signal and a voltage $V_{com}$ provided by the DC drive signal provided by the second drive circuit have the relationship of $V_{op}=|V_1-V_{com}|>0$, and the liquid crystal molecules deflect, wherein $V_{op}$ is a liquid crystal driving voltage; in the anti-peeping ON state, the voltage $V_1$ provided by the first drive signal and the voltage $V_{com}$ provided by the DC drive signal have the relationship of $V_{op}=|V_1-V_{com}|=0$, and the liquid crystal molecules do not deflect.

Figure 6:
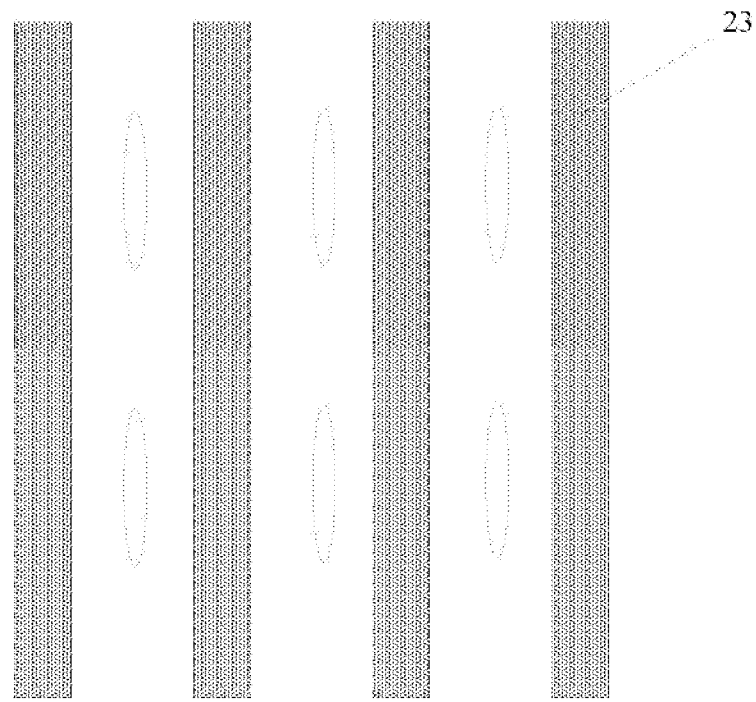
FIG. 6 is a schematic drawing of orientations of liquid crystal molecules of the regulators of FIG. 3 or FIG. 4.
Figure 7:
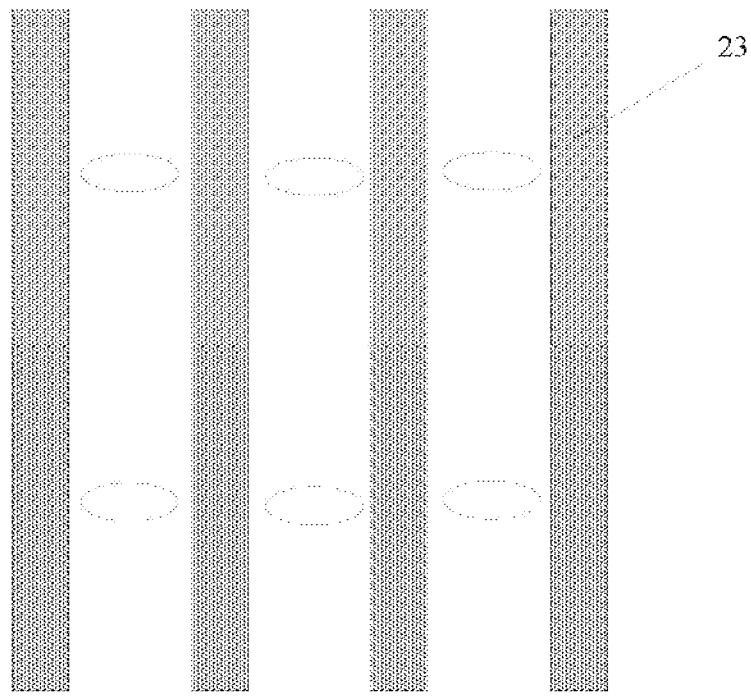
FIG. 7 is another schematic drawing of orientations of the liquid crystal molecules of the regulators of FIG. 3 or FIG. 4.
Figure 8:
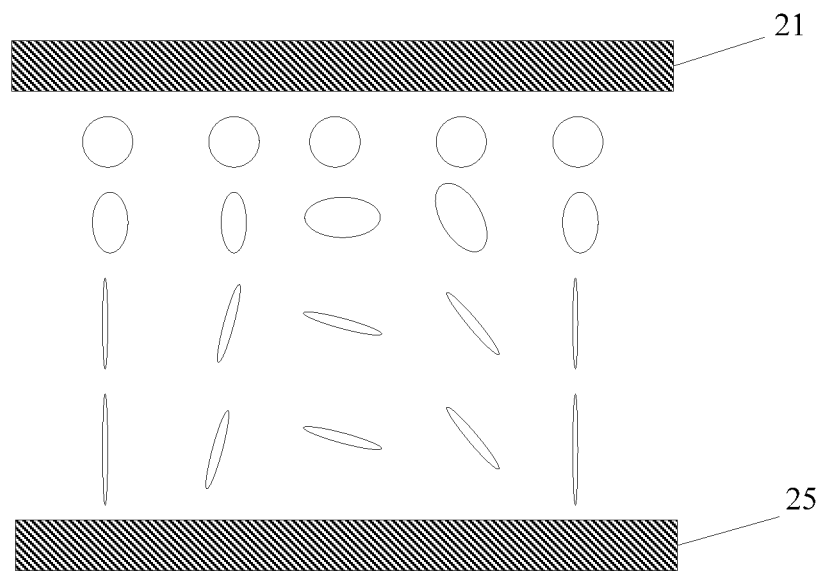
FIG. 8 is a schematic drawing of deflection of the liquid crystal molecules of the regulators of FIG. 3 or FIG. 4.
Figure 9:
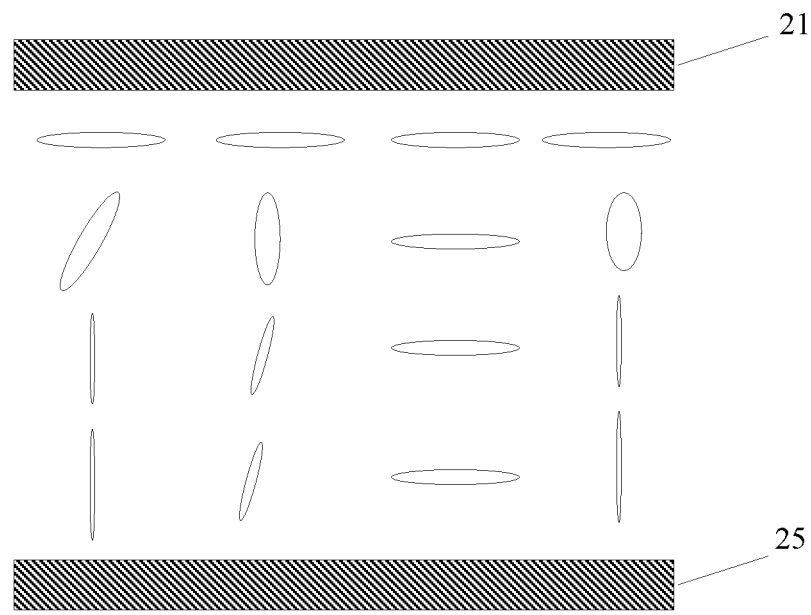
FIG. 9 is another schematic drawing of deflection of the liquid crystal molecules of the regulators of FIG. 3 or FIG. 4.

In exemplary embodiments, the first drive circuit can be a square wave drive circuit, the square wave drive circuit is configured to provide a square wave drive signal to the first electrode, and the DC drive circuit is configured to provide a DC drive signal to the second electrode; in the anti-peeping OFF state, the liquid crystal driving voltage $V_{op}$ satisfies the equation of $V_{op}=V_{max}-V_{com}=V_{com}-V_{min}$, wherein $V_{max}$ is a maximum voltage of the square wave drive signal, $V_{min}$ is a minimum voltage of the square wave drive signal, $V_{com}$ is a voltage of the DC drive signal; in the anti-peeping ON state, the liquid crystal driving voltage $V_{op}$ of the square wave drive signal and the voltage $V_{com}$ of the DC drive signal are both zero; wherein, when the liquid crystal driving voltage $V_{op}$ satisfies the equation of $V_{op}=V_{max}-V_{com}=V_{com}-V_{min}$; the liquid crystal molecules deflect, as shown in FIG. 8 or FIG. 9;

when the liquid crystal driving voltage $V_{op}$ and the voltage $V_{com}$ of the DC drive signal are both zero, the liquid crystal molecules do not deflect, as shown in FIG. 6 or FIG. 7.

In the display device provided in this embodiment, a method for controlling the deflection states of the liquid crystal molecules may comprise:

providing a square wave drive signal to the first electrode by the square wave drive circuit, and providing a DC drive signal to the second electrode by the DC drive circuit, so that the liquid crystal molecules deflect when the liquid crystal driving voltage $V_{op}$ satisfies the equation of $V_{op}=V_{max}-V_{com}=V_{com}-V_{min}$; or that the liquid crystal molecules do not deflect when the liquid crystal driving voltage $V_{op}$ and the driving voltage $V_{com}$ of the DC drive signal are both zero.

It can be seen that a square wave drive signal is provided to the first electrode by the square wave drive circuit, and a DC drive signal is provided to the second electrode by the DC drive circuit, the electric field is generated between the first electrode 23 and the second electrode 24. When the liquid crystal driving voltage $V_{op}$ satisfies the equation of $V_{op}=V_{max}-V_{com}=V_{com}-V_{min}$, the deflection angle of the liquid crystal molecules can enable the anti-peeping backlight to deflect when passing through the liquid crystal layer 22, and the deflected light can make the display device to be in the normal display mode, i.e. the anti-peeping OFF state. In addition, when the liquid crystal driving voltage $V_{op}$ and the voltage $V_{com}$ of the DC drive signal are both zero, no electric field is generated between the first electrode 23 and the second electrode 24, and the liquid crystal molecules do not deflect, then the anti-peeping backlight does not change its angle after passing through the liquid crystal layer 22, thus the display device is in the anti-peeping display mode, i.e. the anti-peeping ON state.

Hence, by controlling the driving voltage applied to the first electrode 23 and the second electrode 24, switching between the normal display mode and the anti-peeping display mode of the display device can be realized. Since the square wave drive signal is a positive-negative inverted signal, an electric field direction between the first electrode 23 and the second electrode 24 will change with the change of the polarity of the square wave driving signal, thus preventing the liquid crystal molecules from bearing forces of a single direction for a long time to incur liquid crystal polarization, accordingly, the use life of the display device is prolonged.

It shall be noted that there are two orientations for the liquid crystal molecules in the embodiment of the present disclosure, which will be described below with reference to the drawings.

In a first state, referring to FIG. 6, when liquid crystal molecules in the liquid crystal layer 22 are not deflected, the initial orientation of the liquid crystal molecules is parallel to the plane of the first substrate 25 and is parallel to an extension direction of the first electrode 23. Correspondingly, when the liquid crystal molecules deflect under the effect of the electric field force, the orientation thereof is as shown in FIG. 8.

In a second state, referring to FIG. 7, when liquid crystal molecules are not deflected, the initial orientation of the liquid crystal molecules is parallel to the plane of the first substrate 25 and is perpendicular to the extension direction of the first electrode 23. Correspondingly, when the liquid crystal molecules deflect under the effect of the electric field force, the orientation thereof is as shown in FIG. 9.

It shall be noted that when the liquid crystal molecules are not deflected, the orientation of the liquid crystal molecules can be freely set as desired, which is not limited in the present embodiment.

In exemplary embodiments, referring to FIG. 3, the first electrode 23 can be a plurality of strip electrodes, which are arranged in parallel with equal interval, and the second electrode 24 can be a planar electrode.

In exemplary embodiments, the first electrode 23 is a pixel electrode and the second electrode 24 is a common electrode.

Since the deflection state of all liquid crystals in the liquid crystal layer 22 can be equivalent to one liquid crystal deflection equivalent interface, a width of each strip electrode in the regulator 2, an interval between adjacent strip electrodes, properties of the liquid crystals used, a value of the driving voltage applied and a thickness of the liquid crystal layer 22 determine a deflection angle of the anti-peeping backlight after passing through the regulator 2. Therefore, by making selections about the above-mentioned parameters, the liquid crystal deflection equivalent interface can be optimized, thereby better controlling the deflection angle of the anti-peeping backlight after passing through the regulator 2.

In exemplary embodiments, in order to achieve a better deflection effect of the anti-peeping backlight under a voltage-on state, the liquid crystal molecules in the liquid crystal layer 22 may adopt a high refractive index difference $\Delta n>=0.3$, the interval between adjacent strip electrodes is 3 μm-10 μm, the width of each strip electrode is 1 μm-5 μm, and the thickness of the liquid crystal layer 22 is 3 μm-7 μm.

An embodiment of the present disclosure provides an optimized display device, wherein the anti-peeping light emitted by the anti-peeping backlight module 3 has a divergence angle of −30° to 30°, the interval between adjacent strip electrodes is 7 μm, the width of each strip electrode is 3 μm, the thickness of the liquid crystal layer 22 is 5.8 μm, the refractive index difference of the liquid crystal molecules is $\Delta n=0.319$, and the liquid crystal driving voltage $V_{op}$ under the condition of the square wave drive signal is 10V; and wherein when the liquid crystal molecules are not deflected, the initial orientation of the liquid crystal molecules, as shown in FIG. 7, is parallel the plane of the first substrate 25 and perpendicular to the direction of the first electrode 23, and when the anti-peeping OFF state is enabled, a voltage is applied to the first electrode and the second electrode to make the obtained divergence light to have an angle of −65° to 65°.

It shall be pointed out that the above-mentioned specific values for the width of each strip electrode, the interval between adjacent strip electrodes and the thickness of the liquid crystal layer 22 are only exemplary, but they do not intend to limit the actual values thereof.

Figure 4:
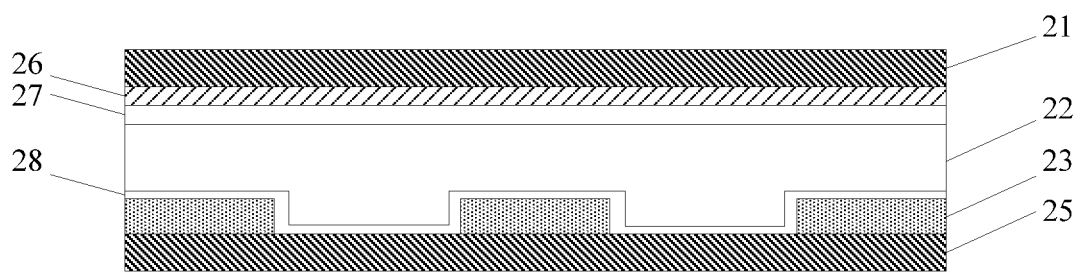
FIG. 4 is another structural diagram of the regulator of FIG. 1 or FIG. 2.

Referring to FIG. 4, a second structure of the regulator 2 in the display device may include the first substrate 25 and the second substrate 21, wherein the liquid crystal layer 22 is disposed between the first substrate 25 and the second substrate 21, the first electrode 23 is arranged between the liquid crystal layer 22 and the first substrate 25.

In the display device provided in this embodiment, the regulating principle of obtaining the divergent light or anti-peeping light through the regulator 2 may be as follows:

in the anti-peeping OFF state: deflection states of liquid crystal molecules are controlled by means of the first electrode 23, so that the liquid crystal molecules deflect to increase the divergence angle of the anti-peeping backlight, thereby obtaining the divergent light;

in the anti-peeping ON state: deflection states of the liquid crystal molecules are controlled by means of the first electrode 23, so that the liquid crystal molecules do not deflect and the divergence angle of the anti-peeping backlight is maintained, thereby obtaining the anti-peeping light.

Based on the above specific structure of the regulator 2, a driving voltage can be applied between the first electrodes 23 to generate an electric field to drive the liquid crystal molecules in the liquid crystal layer 22 to deflect, thereby controlling the deflection states of the liquid crystal molecules. Therefore, by controlling the driving voltage applied to the first electrode 23, the deflection states of the liquid crystal molecules can be changed, and the angle of deflection of the anti-peeping backlight transmitted in the liquid crystal layer 22 can be changed, thereby enabling the display device to switch between the normal display mode and the anti-peeping display mode.

The regulator 2 may further comprise the first orientation layer 28, the second orientation layer 27 and the flat layer 26, wherein the first orientation layer 28 is arranged between the first electrode 23 and the liquid crystal layer 22, the second orientation layer 27 is arranged between the liquid crystal layer 22 and the second substrate 21, and the flat layer 26 is arranged between the second orientation layer 27 and the second substrate 21.

In order to enable the regulator 2 to control the anti-peeping backlight, one of two adjacent strip electrodes in the display device is connected to the first drive circuit, and the other is connected to the second drive circuit. The first drive circuit supplies the first drive signal to the correspondingly connected strip electrode, and the second drive circuit supplies the second drive signal to the correspondingly connected strip electrode; wherein both the first drive circuit and the second drive circuit are DC drive circuits, or both the first drive circuit and the second drive circuit are square wave drive circuits, or the first drive circuit is the DC drive circuit and the second drive circuit is the square wave drive circuit.

In the anti-peeping OFF state, the voltage $V_1$ provided by the first drive signal and the voltage $V_2$ provided by the second drive signal satisfy $V_{op}=|V_1-V_2|>0$; wherein $V_{op}$ is the liquid crystal driving voltage.

In the anti-peeping ON state, the voltage $V_1$ provided by the first drive signal and the voltage $V_2$ provided by the second drive signal satisfy $V_{op}=|V_1-V_2|=0$.

In the display device provided in this embodiment, a method for controlling deflection states of the liquid crystal molecules comprises:

providing the first drive signal to the correspondingly connected strip electrode by the first drive circuit, and providing the second drive signal to the correspondingly connected strip electrode by the second drive circuit, so that the liquid crystal molecules deflect when the driving voltage $V_1$ provided by the first drive signal and the driving voltage $V_2$ provided by the second drive signal satisfy $V_{op}=|V_1-V_2|>0$, wherein $V_{op}$ is the liquid crystal driving voltage; or that the liquid crystal molecules do not deflect when the driving voltage $V_1$ provided by the first drive signal and the driving voltage $V_2$ provided by the second drive signal satisfy $V_{op}=|V_1-V_2|=0$.

It can be seen that by applying different driving voltages to the adjacent two strip electrodes, the electric field is generated therebetween, so that the liquid crystal molecules in the liquid crystal layer 22 deflect. When the liquid crystal driving voltage $V_{op}$ satisfies $V_{op}=|V_1-V_2|>0$, the deflection angle of the liquid crystal molecules can enable the anti-peeping backlight to deflect after passing through the liquid crystal layer 22, and the deflected light can make the display device to be in the normal display mode. In addition, when the driving voltage $V_1$ provided by the first drive signal and the driving voltage $V_2$ provided by the second drive signal satisfy $V_{op}=|V_1-V_2|=0$, no electric field is generated between the adjacent strip electrodes, and the liquid crystal molecules do not deflect, then the anti-peeping backlight does not change its angle after passing through the liquid crystal layer 22, thus the display device is in the anti-peeping display mode.

Hence, by controlling the driving voltages applied to the adjacent strip electrodes, switching between the normal display mode and the anti-peeping display mode of the display device can be realized. In addition, if both the first drive circuit and the second drive circuit are square wave drive circuits, since the first square wave drive signal and the second square wave drive signal are positive-negative inverted signals, the direction of the electric field between the adjacent strip electrodes will change with the change of the signal polarity, thus preventing the liquid crystal molecules from bearing forces of a single direction for a long time to incur liquid crystal polarization, accordingly, the use life of the display device is prolonged. Moreover, the regulator 2 in this embodiment does not have any second electrode 24, so the thickness of the regulator 2 is effectively reduced, and the display device can be made lighter and thinner.

In exemplary embodiments, the first electrodes 23 can be a plurality of strip electrodes, which are arranged in parallel with equal interval, and the first electrodes 23 can be pixel electrodes.

In order to achieve a better deflection effect of the anti-peeping backlight under a voltage-on state, the liquid crystals in the liquid crystal layer 22 may adopt a high refractive index difference $\Delta n \geq 0.3$, the interval between adjacent strip electrodes can be 3 μm-5 μm, the width of each strip electrode can be 1 μm-2.5 μm, and the thickness of the liquid crystal layer 22 can be 3 μm-10 μm.

In exemplary embodiments, the display device may further comprise an upper polarizer and a lower polarizer. When the regulator 2 is arranged between the anti-peeping backlight module 3 and the display panel 1, the upper polarizer can be arranged on the light exit surface of the display panel 1, and the lower polarizer can be arranged between the light exit surface of the anti-peeping backlight module 3 and the light incident surface of the regulator 2; or the upper polarizer can be arranged on the light exit surface of the display panel 1, and the lower polarizer can be arranged between the light exit surface of the regulator 2 and the light incident surface of the display panel 1;

when the regulator 2 is arranged on the light exit surface of the display panel 1, the upper polarizer can be arranged between the light exit surface of the display panel 1 and the light incident surface of the regulator 2, and the lower polarizer can be arranged between the light exit surface of the anti-peeping backlight module 3 and the light incident surface of the display panel 1; or the upper polarizer can be arranged on the light exit surface of the regulator 2, and the lower polarizer can be arranged between the light exit surface of the anti-peeping backlight module 3 and the light incident surface of the display panel 1.

In the embodiment, arrangements of the upper polarizer and the lower polarizer are specifically set according to the position of the regulator 2.

Figure 5:
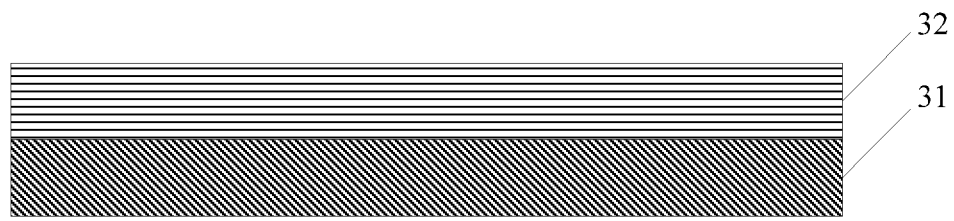
FIG. 5 is a structural diagram of an anti-peeping backlight module of FIG. 1 or FIG. 2.

It shall be understood that the anti-peeping backlight module 3 may further comprise a backlight 31 and a collimator 32, as shown in FIG. 5. The collimator 32 can be arranged on a light exit surface of the backlight 31, and the collimator 32 is configured to reduce the divergence angle of the backlight to obtain anti-peeping backlight.

It shall be noted that said display device can realize any one of the ADS display mode, the IPS display mode and the TN display mode.

Figure 10:
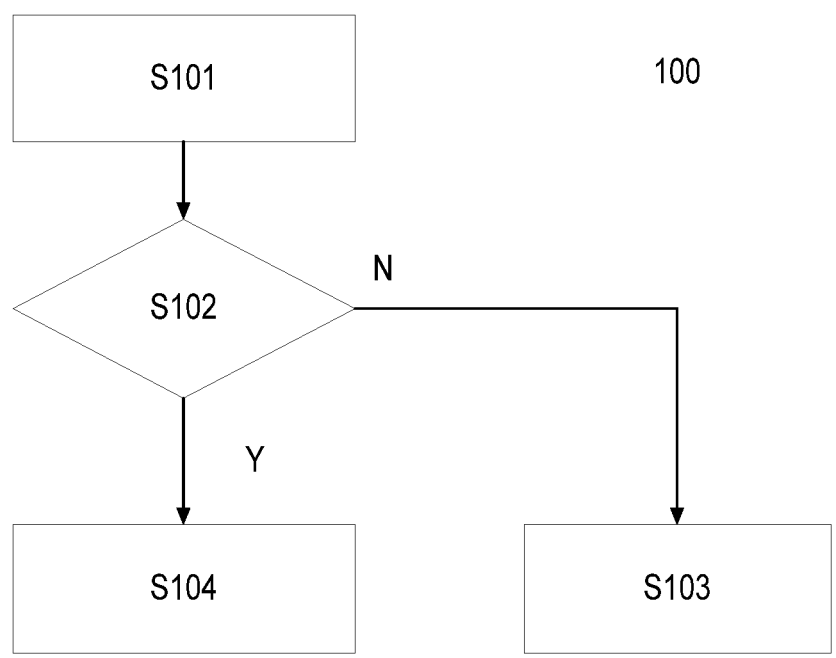
FIG. 10 is a flow chart of a display method for the display device in an embodiment of the present disclosure.

According to another embodiment of the present disclosure, a display method 100 for the display device is provided, as shown in FIG. 10, which can be applied to the display device as described in the above embodiments. Said display method may comprise:

determining a state of the display device (S101);

if the display device is in the anti-peeping OFF state (S102, N), emitting anti-peeping backlight by the anti-peeping module 3 and increasing the divergence angle of the anti-peeping backlight by means of the regulator 2 so as to obtain divergent light (S103);

if the display device is in the anti-peeping ON state (S102, Y), emitting anti-peeping backlight by the anti-peeping module 3 and maintaining the divergence angle of the anti-peeping backlight by means of the regulator 2 so as to obtain anti-peeping light (S104).

Compared to the related art, the anti-peeping display method provided in this embodiment of the present disclosure has the same advantageous effects as the display device provided in the above embodiments, which will not be elaborated herein any more.

It shall be appreciated that in the embodiments of the present disclosure, there might be various methods for obtaining the divergent light or anti-peeping light.

As mentioned above, the regulator 2 in the display device comprises the first substrate 25 and the second substrate 21, wherein the liquid crystal layer 22 is disposed between the first substrate 25 and the second substrate 21, the first electrode 23 is arranged between the liquid crystal layer 22 and the first substrate 25, the second electrode 24 is arranged between the first electrode 23 and the first substrate 25, and the first electrode 23 and the second electrode 24 are insulated from each other. Then, a first method of obtaining the divergent light may include: controlling deflection states of the liquid crystal molecules using the first electrode 23 and the second electrode 24, so that the liquid crystal molecules deflect so as to increase the divergence angle of the anti-peeping backlight to obtain the divergent light; and a first method of obtaining the anti-peeping light may include: controlling deflection states of the liquid crystal molecules using the first electrode 23 and the second electrode 24, so that the liquid crystal molecules do not deflect so as to maintain the divergence angle of the anti-peeping backlight to obtain the anti-peeping light.

In exemplary embodiments, the regulator 2 further comprises the square wave drive circuit connected to the first electrode 23 and the DC drive circuit connected to the second electrode 24, and the method of controlling the deflections states of the liquid crystal molecules comprises:

providing a square wave drive signal to the first electrode 23 by the square wave drive circuit, and providing a DC drive signal to the second electrode by the DC drive circuit, so that the liquid crystal driving voltage $V_{op}$ satisfies the equation of $V_{op}=V_{max}-V_{com}=V_{com}-V_{min}$, and thus the liquid crystal molecules deflect; when both the liquid crystal driving voltage $V_{op}$ and the driving voltage $V_{com}$ of the DC drive signal are zero, the liquid crystal molecules do not deflect.

Compared to the related art, the anti-peeping display method provided in the embodiment of the present disclosure has the same advantageous effects as the display device provided in the above embodiments, which will not be elaborated herein any more.

In exemplary embodiments, as mentioned above, the regulator 2 in the display device comprises the first substrate 25 and the second substrate 21, wherein the liquid crystal layer 22 is disposed between the first substrate 25 and the second substrate 21, and the first electrode 23 is arranged between the liquid crystal layer 22 and the first substrate 25. Then, a second method of obtaining the divergent light may include: controlling deflection states of the liquid crystal molecules using the first electrode 23, so that the liquid crystal molecules deflect so as to increase the divergence angle of the anti-peeping backlight to obtain the divergent light, and a second method of obtaining the anti-peeping light may include: controlling deflection states of the liquid crystal molecules using the first electrode 23, so that the liquid crystal molecules do not deflect so as to maintain the divergence angle of the anti-peeping backlight to obtain the anti-peeping light.

Compared to the related art, the anti-peeping display method provided in the embodiment of the present disclosure has the same advantageous effects as the display device provided in the above embodiments, which will not be elaborated herein any more.

As an example, one of two adjacent strip electrodes in the regulator 2 is connected to the first drive circuit, and the other is connected to the second drive circuit. The first drive circuit supplies the first drive signal to the correspondingly connected strip electrode, and the second drive circuit supplies the second drive signal to the correspondingly connected strip electrode, then controlling the deflection states of the liquid crystal molecules may comprise:

providing the first drive signal to the correspondingly connected strip electrode by the first drive circuit, and providing the second drive signal to the correspondingly connected strip electrode by the second drive circuit, so that the driving voltage $V_1$ provided by the first drive signal and the driving voltage $V_2$ provided by the second drive signal satisfy $V_{op}=|V_1-V_2|>0$, and thus the liquid crystal molecules deflect, wherein $V_{op}$ is the liquid crystal driving voltage; or that the driving voltage $V_1$ provided by the first drive signal and the driving voltage $V_2$ provided by the second drive signal satisfy $V_{op}=|V_1-V_2|=0$, and the liquid crystal molecules do not deflect.

In the descriptions of the above embodiments, specific features, structures, materials or characteristics can be combined in appropriate manners in any one or more embodiments or examples.

The above described are merely examples of the present disclosure, but the protection scope of the present disclosure is not limited to this. Any amendment or replacement that can be easily conceived by those skilled in the art within the technical scope disclosed by the present disclosure shall fall into the protection scope of the present disclosure. Therefore, the protection scope of the present disclosure shall be defined by the claims.

The invention claimed is:

1. A display device, comprising:
    an anti-peeping backlight module,
    a display panel, and
    a regulator comprising a first substrate, a second substrate, a liquid crystal layer that is disposed between the first substrate and the second substrate, a first electrode that is arranged between the liquid crystal layer and the first substrate, a second electrode that is arranged between the first electrode and the first substrate, the first electrode and the second electrode being insulated from each other;
    wherein the display panel is arranged on a light exit surface of the anti-peeping backlight module,
    wherein the anti-peeping backlight module is configured to emit an anti-peeping backlight, and
    wherein the display device has an anti-peeping OFF state and an anti-peeping ON state,
    wherein, in the anti-peeping OFF state, liquid crystal molecules in the liquid crystal layer deflect under an effect of the electric field force so as to increase a divergence angle of the anti-peeping backlight to obtain a divergent light;
    wherein, in the anti-peeping ON state, the liquid crystal molecules in the liquid crystal layer do not deflect so as to maintain the divergence angle of the anti-peeping backlight to obtain an anti-peeping light;
    wherein the regulator further comprises a square wave drive circuit connected to the first electrode, and a DC drive circuit connected to the second electrode;
    wherein the square wave drive circuit is configured to provide a square wave drive signal to the first electrode, and wherein the DC drive circuit is configured to provide a DC drive signal to the second electrode;
    wherein in the anti-peeping OFF state, a liquid crystal driving voltage $V_{op}$ satisfies the equation of $V_{op}=V_{max}-V_{com}=V_{com}-V_{min}$, wherein $V_{max}$ is a maximum voltage of the square wave drive signal, $V_{min}$ is a minimum voltage of the square wave drive signal, and $V_{com}$ is a voltage of the DC drive signal; and
    wherein in the anti-peeping ON state, the liquid crystal driving voltage $V_{op}$ and the voltage $V_{com}$ of the DC drive signal are both zero.

2. The display device according to claim 1, wherein the first electrode comprises a plurality of strip electrodes, which are arranged in parallel with equal intervals between each, and the second electrode is a planar electrode.

3. The display device according to claim 2, wherein the interval between adjacent strip electrodes is 3 µm-10 µm, and a width of each strip electrode is 1 µm-5 µm.

4. The display device according to claim 1, wherein a refractive index difference of the liquid crystal layer is greater than or equal to 0.3.

5. The display device according to claim 1, wherein the anti-peeping backlight module further comprises a backlight and a collimator, and wherein the collimator is arranged on a light exit surface of the backlight, and the collimator is configured to reduce the divergence angle of the backlight so as to obtain the anti-peeping backlight.

6. The display device according to claim 1, wherein in when liquid crystal molecules in the liquid crystal layer are not deflected, an initial orientation of the liquid crystal molecules is parallel to a plane of the first substrate and parallel to an extension direction of the first electrode.

7. A display method applied to the display device according to claim 1, comprising:
    determining a state of the display device;
    if the display device is in the anti-peeping OFF state, emitting the anti-peeping backlight by the anti-peeping backlight module, and increasing the divergence angle of the anti-peeping backlight using the regulator so as to obtain the divergent light;
    if the display device is in the anti-peeping ON state, emitting the anti-peeping backlight by the anti-peeping backlight module, and maintaining the divergence angle of the anti-peeping backlight using the regulator so as to obtain the anti-peeping light.

8. The display method according to claim 7,
    wherein
    said increasing the divergence angle of the anti-peeping backlight using the regulator so as to obtain the divergent light comprises:
        controlling deflection states of the liquid crystals using the first electrode and the second electrode, so that the liquid crystals deflect so as to increase the divergence angle of the anti-peeping backlight to obtain the divergent light;
    said maintaining the divergence angle of the anti-peeping backlight using the regulator so as to obtain the anti-peeping light comprises:
        controlling deflection states of the liquid crystals using the first electrode and the second electrode, so that the liquid crystals do not deflect so as to maintain the divergence angle of the anti-peeping backlight to obtain the anti-peeping light.

9. The display device according to claim 1, wherein in the case where liquid crystals in the liquid crystal layer are not deflected, an initial orientation of the liquid crystals is parallel to a plane of the first substrate and perpendicular to an extension direction of the first electrode.

10. A display device, comprising:
    an anti-peeping backlight module,
    a display panel, and
    a regulator comprising a first substrate, a second substrate, a liquid crystal layer that is disposed between the first substrate and the second substrate, a first electrode that is arranged between the liquid crystal layer and the first substrate;
    wherein the display panel is arranged on a light exit surface of the anti-peeping backlight module,
    wherein the anti-peeping backlight module is configured to emit an anti-peeping backlight, and
    wherein the display device has an anti-peeping OFF state and an anti-peeping ON state, wherein, in the anti-peeping OFF state, liquid crystal molecules in the liquid crystal layer deflect under an effect of the electric field force so as to increase a divergence angle of the anti-peeping backlight to obtain a divergent light;

wherein, in the anti-peeping ON state, the liquid crystal molecules in the liquid crystal layer do not deflect so as to maintain the divergence angle of the anti-peeping backlight obtain an anti-peeping light;

wherein the first electrode comprises a plurality of strip electrodes, which are arranged in parallel with equal intervals between each;

wherein the regulator further comprises a first drive circuit connected to the first electrode, and a second drive circuit connected to the second electrode;

wherein the first drive circuit is configured to provide a first drive signal to the first electrode, and wherein the second circuit is configured to provide a second drive signal to the second electrode;

wherein one of two adjacent strip electrodes is connected to the first drive circuit, and the other is connected to the second drive circuit;

wherein the first drive circuit supplies the first drive signal to the correspondingly connected strip electrode;

wherein the second drive circuit supplies the second drive signal to the correspondingly connected strip electrode; and wherein in the anti-peeping OFF state, a voltage $V_1$ of the first drive signal and a voltage $V_2$ of the second drive signal satisfy $V_{op}=|V_1-V_2|>0$, wherein $V_{op}$ is a liquid crystal driving voltage; and in the anti-peeping ON state, the voltage $V_1$ of the first drive signal and the voltage $V_2$ of the second drive signal satisfy $V_{op}=|V_1-V_2|=0$.

11. The display device according to claim 10, wherein the interval between adjacent strip electrodes is 3 μm-5 μm, and a width of each strip electrode is 1 μm-2.5 μm.

12. The display device according to claim 10, wherein a refractive index difference of the liquid crystal layer is greater than or equal to 0.3.

13. The display device according to claim 10, wherein the anti-peeping backlight module further comprises a backlight and a collimator, and wherein the collimator is arranged on a light exit surface of the backlight, and the collimator is configured to reduce the divergence angle of the backlight so as to obtain the anti-peeping backlight.

14. The display device according to claim 10, wherein in when liquid crystal molecules in the liquid crystal layer are not deflected, an initial orientation of the liquid crystal molecules is parallel to a plane of the first substrate and parallel to an extension direction of the first electrode.

15. The display device according to claim 10, wherein in the case where liquid crystal molecules in the liquid crystal layer are not deflected, an initial orientation of the liquid crystals is parallel to a plane of the first substrate and perpendicular to an extension direction of the first electrode.

16. A display method applied to the display device according to claim 10, comprising:

determining a state of the display device;

if the display device is in the anti-peeping OFF state, emitting the anti-peeping backlight by the anti-peeping backlight module, and increasing the divergence angle of the anti-peeping backlight using the regulator so as to obtain the divergent light;

if the display device is in the anti-peeping ON state, emitting the anti-peeping backlight by the anti-peeping backlight module, and maintaining the divergence angle of the anti-peeping backlight using the regulator so as to obtain the anti-peeping light.

17. The display method according to claim 16, wherein:

said increasing the divergence angle of the anti-peeping backlight using the regulator so as to obtain the divergent light comprises:

controlling deflection states of the liquid crystals using the first electrode, so that the liquid crystals deflect so as to increase the divergence angle of the anti-peeping backlight to obtain the divergent light;

said maintaining the divergence angle of the anti-peeping backlight using the regulator so as to obtain the anti-peeping light comprises:

controlling deflection states of the liquid crystals using the first electrode, so that the liquid crystals do not deflect so as to maintain the divergence angle of the anti-peeping backlight to obtain the anti-peeping light.

* * * * *